UNITED STATES PATENT OFFICE.

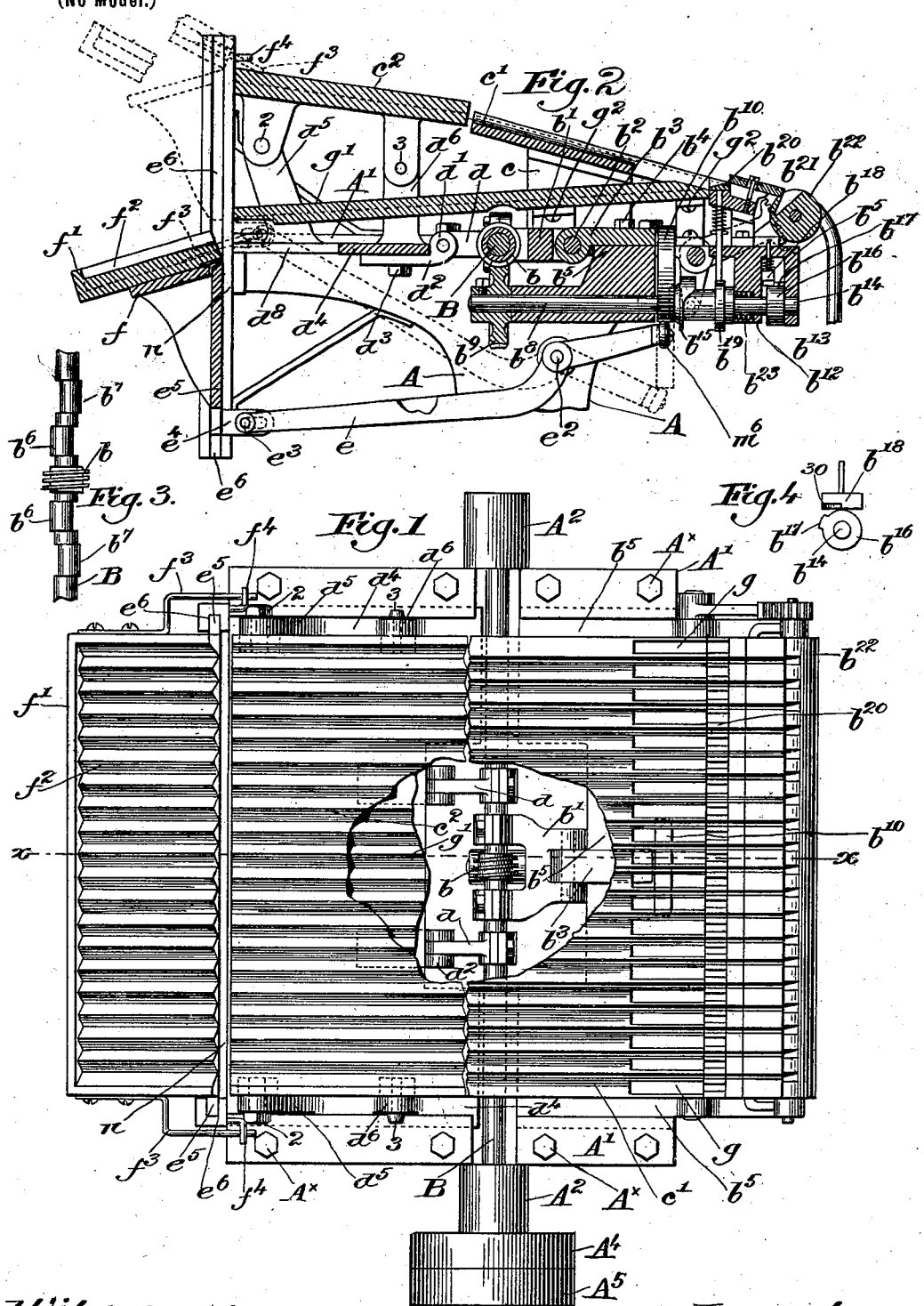

BENJAMIN F. MAYO, OF SALEM, MASSACHUSETTS, ASSIGNOR, BY MESNE ASSIGNMENTS, TO THE UNITED SHOE MACHINERY COMPANY, A CORPORATION OF NEW JERSEY.

NAIL-ASSORTING MECHANISM.

SPECIFICATION forming part of Letters Patent No. 707,136, dated August 19, 1902.

Application filed June 15, 1898. Serial No. 683,476. (No model.)

*To all whom it may concern:*

Be it known that I, BENJAMIN F. MAYO, of Salem, county of Essex, State of Massachusetts, have invented an Improvement in Nail-Assorting Mechanism, of which the following description, in connection with the accompanying drawings, is a specification, like characters on the drawings representing like parts.

This invention has for its object to improve that class of nail-assorting mechanism wherein a series of nails are conducted down a raceway-groove.

One part of my present invention consists in dividing the raceway-plate transversely into a plurality of parts and imparting to each of said parts movement in the direction of the length of the raceway-grooves. Also I have combined with a raceway-plate a novel nail-lifting mechanism to supply the raceway-plate and its grooves with nails.

Figure 1 is a top or plan view of a sufficient portion of a nail-assorting apparatus to illustrate my improvement. Fig. 2 is a partial section thereof in the line $x$, Fig. 1. Fig. 3 is a detail of the shaft B, showing its eccentric; and Fig. 4 is a detail showing the arm $b^{18}$ detached from the machine.

The framework of the machine presents two side pieces A, one being shown in Fig. 2, said side pieces having at their upper ends suitable flanges to which are attached by screws $A^\times$ way-pieces A', said side pieces also having suitable bearings or boxes $A^2$ to receive and sustain the main shaft B, having suitable fast and loose pulleys $A^4$ $A^5$, to which will be applied any usual belt to rotate the shaft.

The shaft B has a worm $b$, and, as shown, it has four eccentrics (see Fig. 3) made in pairs. The central pair of eccentrics $b^6$ receive about them two eccentric-straps, forming part of a link $b'$, joined by a pin $b^2$ with a suitable ear $b^3$, attached to a plate $b^5$, the ends of said plate entering suitable guideways under the way-pieces of the side frames.

The plate $b^5$ has at its upper side suitable uprights $c$, to which is attached in any usual or suitable manner the plate $c'$ of the raceway, having a series of grooves made longitudinally therein to conduct the nails down to any usual or suitable controlling devices, such as common to United States Patent No. 577,213, dated February 16, 1897. The plate $b^5$ has at its under side (see Fig. 2) a boss, which constitutes a bearing for a shaft $b^8$, having at one end a worm-toothed gear $b^9$, which is engaged and driven by the worm $b$, said shaft $b^8$ having attached to it, near its opposite end, a cam or eccentric $b^{10}$, the face of which in the line of said shaft has a conical cavity (shown by dotted lines in said figure) to form part of a friction-clutch. The plate $b^5$ has also depending from it other bosses $b^{12}$ $b^{13}$, which receive a short shaft $b^{14}$, the inner end of which is provided with a cone-shaped hub $b^{15}$, forming a second member of a clutch, said hub entering the conical cavity of the cam $b^{10}$ and causing said shaft $b^{14}$ to be rotated in unison with the shaft $b^8$, and when said conical part is disengaged from the cam $b^{10}$ then the shaft $b^{14}$ will be left at rest.

The shaft $b^{14}$ has attached to it at its outer end a collar $b^{16}$, having a projection $b^{17}$, which acts at each rotation of the shaft $b^{14}$ against the wedge-shaped side 30 (see Fig. 4) of a spring-pressed arm $b^{18}$, which causes the said shaft $b^{14}$ to be moved to the right, viewing Fig. 1, thus opening the clutch and stopping its rotation, this happening at each rotation of the shaft. The shaft $b^{14}$ has a cam $b^{19}$, which acts to raise a nail-lifter $b^{20}$, of usual construction, so that it puts its series of nails taken from the raceway onto a raceway-terminal $b^{21}$, from which said nails enter pockets in a controller $b^{22}$, substantially as contained in said patent. Whenever the shaft $b^{14}$ is to be started to operate the controller and the lifter, the arm $b^{18}$ may be elevated in any usual manner from behind the projection $b^{17}$, and thereafter a spring $b^{23}$, surrounding said shaft, will operate to move it to the left and effect the engagement of the driving-clutch, hereinbefore described.

From the foregoing description it will be understood that the shafts $b^8$ and $b^{14}$ reciprocate with the plate $b^5$.

The second pair of eccentrics $b^7$ on the shaft

B, reversely set, are embraced by a pair of links $d$, shown as united by suitable pins $d'$ with ears $d^2$, secured by suitable bolts $d^3$ to a sliding plate $d^4$, the ends of said plate traveling in a slot below the way-pieces A', said plate $d^4$ having erected upon it suitable uprights $d^5\ d^6$, having attached to them by suitable pins 2 3 suitable ears depending from the second portion or plate $c^2$ of the raceway.

The plates $c'\ c^2$ constitute a raceway, and it will be noticed that they are divided and separated one from the other transversely, thus making a raceway of a plurality of plates set at an inclination one below the other, and by the rotation of the shaft B described the reversely-placed eccentrics, through the connections described, may impart to the two plates or parts of the raceway a reciprocating motion in the direction of the length of the grooves in the said plates, and these reciprocations may take place simultaneously in opposite directions, or the eccentric might be so placed as to shake one of the said plates and immediately after the other plate, the object then being to give each plate a separate shaking motion in a different time and in the direction of the length of the raceway-grooves. Heretofore the raceways used in this class of machine have been reciprocated, and in practice it has been found that the strain required to move said raceways and the strain exerted in reversing their movements have so jarred the comparatively light-weight heel-attaching machines with which the nail-assorting mechanism is commonly employed that the heel-attaching machine could not be practically used; but in my efforts to enable a nail-assorting mechanism to be used with a heel-attaching machine I discovered that by dividing the raceway transversely and by imparting to the different parts of the raceway independent movements, preferably in opposite directions and substantially simultaneously, I was enabled to do away with the jarring strains and other objections hitherto existing to the use of such mechanism. I believe myself to be the first to divide a raceway into a plurality of parts and move the parts independently to thereby impart to the raceway proper shaking motions to enable the nails to travel thereon. I have also by my invention been enabled to do entirely away with any of the usual means heretofore employed to hammer or strike the raceway in order that the nails might travel down the same and be delivered therefrom.

The plate $d^4$ has a notch $d^8$, (see Fig. 2,) in which may play one end of a suitable lever $e$, having its fulcrum at $e^2$, said lever having at its longer end a suitable pin or stud $e^3$, which enters a slot in an ear $e^4$, connected with a slide $e^5$, fitted to be moved up and down in suitable guiding-grooves $e^6$ in a part of the framework of the machine. The plate $e^5$ at or near its upper end has a shelf $f$, and to the upper end of said slide is hinged, as shown in Fig. 2, a nail-feeding plate $f'$, it being represented as a box having a series of longitudinal grooves or corrugations $f^2$.

The nails to be delivered upon the plates $c^2\ c'$ are first supplied in the nail-feeding plate $f'$, and as the lever $e$ is moved to raise the slide said feeding-plate rises with it into the position shown by dotted lines in Fig. 2, the feeding-plate in its final upward movement being tipped by or through an arm $f^3$, connected with the feeding-plate, it meeting a stud $f^4$, fixed to the framework of the machine. The tipping of the feeding-plate, as represented in dotted lines, Fig. 2, causes the nails thereon to drop into the V-shaped grooves of the plate $c^2$ of the raceway, the bottoms of said grooves being on a level with the bottoms of the narrower grooves in the plate $c'$, forming the lower part of the raceway, the nails in the grooves of the plate $c^2$ readily passing from said grooves into the grooves of the plate $c'$; but any surplus nails leaving the plate $c^2$ and entering the spaces in the plate $c'$ at the sides of the raceway-grooves therein will travel along down said spaces and be discharged through the openings $g$ therein in line with said spaces, said nails falling onto the inclined grooved returning-plate $g'$, which leads back said nails toward the end of the machine, they being returned to the feeding-plate to be again discharged upon the upper portion $c^2$ of the raceway.

The nails lying on the inclined returning-plate $g'$ when the feeding-plate is lifted are prevented from escaping from said returning-plate by means of the slide $e^5$, and any nails sliding down the returning-plate crosswise may drop therefrom through the space $n$ between the delivery end of said returning-plate and the feeding-plate. The returning-plate $g'$ may be reciprocated back and forth in unison with the plate $c'$, it being suitably attached thereto by screws $g^2$, entering ears carried by the plate $b^5$. The lever $e$ derives its movement from the cam or eccentric $b^{10}$, before described, it acting on a roller $m^6$ at one end of said lever.

I have herein chosen to illustrate the raceway as composed of separate plates grooved transversely to form nail-receiving grooves; but instead of these particular plates each having the grooves worked out of it in one solid piece I may employ any other usual or suitable known form of raceway-plate adapted to receive and guide a series of nails. The gist of this invention, so far as it applies to the raceway, is that it has a plurality of plates having suitable grooves or channels in and down which the nails may slide from one to the other.

The grooves in the plate $c^2$ of the raceway are wider and deeper than the grooves in the plate $c'$ of the raceway, and the plate $c^2$ stands at a slightly-higher level than the plate $c'$, and in practice the grooves of the plate $c^2$ each contain many nails, so that there are always sufficient nails to supply the narrower grooves of the plate $c'$, this construction having been provided in order that the narrower grooves may always be kept properly filled, the surplus nails leaving the plate $c^2$ and passing on the plate $c'$, but not entering its nail-guiding grooves, passing down said plate, and being discharged therefrom through the openings $g'$.

Having described my invention, what I desire to claim as new and secure by Letters Patent is—

1. In a nail-assorting mechanism, a raceway composed of a plurality of grooved transversely-arranged plates, and means to move them independently simultaneously in opposite directions, substantially as described.

2. In a nail-assorting mechanism, a raceway composed of a plurality of transversely-arranged grooved plates, a shaft, and means connecting said shaft and plates to move them simultaneously independently one of the other in the direction of the length of the grooves therein, substantially as described.

3. A plurality of inclined raceway-plates, grooved to receive and guide nails, one of said plates occupying a position in a lower plane than the other of said plates, and means to impart motion independently to each of said plates but in opposite directions simultaneously, for the purposes set forth.

4. A raceway presenting a plate having a series of wide and deep grooves, and a second plate in continuation of it having a series of narrow grooves with wider spaces at the sides of said grooves, said second plate being located in a plane below the plane of the former plate, whereby the plate having the narrow grooves may always be kept well filled from the plate having the wide and deep grooves, substantially as described.

5. A raceway presenting an inclined plate having a series of wide and deep grooves, and a second plate having a series of narrow grooves with wider spaces at the sides of said grooves, and discharge-openings, said second plate being located in a plane below the plane of the plate having the wide and deep grooves, whereby the plate having the wide and deep grooves may always keep filled the narrow grooves of the second plate, substantially as described.

6. A raceway presenting an inclined plate having a series of wide and deep grooves, and a second plate having a series of narrow grooves with wider spaces at the sides of said grooves and discharge-openings, said second plate being located in a plane below the plane of the plate having the wide and deep grooves, whereby the plate having the wide and deep grooves may always keep filled the narrow grooves of the second plate, and a returning-plate to receive the nails discharged through said opening, substantially as described.

7. In a nail-assorting mechanism, the following instrumentalities, viz: a raceway composed of a plurality of grooved plates arranged transversely of the machine, a shaft, and connections between it and said plates to move them simultaneously in opposite directions, thus shaking them in the direction of the lengths of the grooves therein; a nail-lifter located at the lower end of said raceway, means to actuate it, raceway-terminals, and a suitable controlling device to provide for the delivery in the proper direction as to their heads and points of the nails leaving the terminal, substantially as described.

8. In a nail-assorting mechanism, a raceway-plate, and an inclined returning-plate to receive upon it surplus nails discharged from said raceway-plate; combined with a nail-feeding plate substantially equal in width to said returning-plate and normally occupying an inclined position at the end of said returning-plate to receive upon it nails leaving said returning-plate, a guide for said feeding-plate, and means to lift said feeding-plate vertically from a position at or below the delivery end of the returning plate into a position at or above the receiving end of the raceway-plate and to tilt said plate, in order that nails coming upon the feeding-plate may be automatically transferred therefrom to said raceway-plate.

9. A nail-assorting mechanism comprising a raceway consisting of a plurality of parts arranged to feed nails and means to move said parts independently, combined with mechanism for receiving nails from said raceway and delivering them all pointing the same way.

10. In a nail-assorting mechanism, the following instrumentalities, viz: a raceway, a returning-plate grooved to receive and guide the nails, combined with a nail-feeding plate having a series of grooves and arranged transversely with relation to said returning-plate, means to move said feeding-plate, it being supported independently of said returning-plate, a suitable transverse space being left between said returning-plate and said feeding-plate for the passage therethrough of nails coming down said returning-plate crosswise of its grooves, substantially as described.

11. A raceway to guide nails presenting a plurality of parts, divided transversely of the direction of travel of the nails, and means to move said parts independently in the direction of the travel of the nails.

12. A raceway consisting of a plurality of parts located at different levels and each having a series of grooves, and means to move said parts independently.

13. A raceway consisting of a plurality of parts, each part having a series of grooves for nails, means to move said parts independently, and means to supply automatically one of said parts with nails to be assorted.

14. A raceway consisting of a plurality of parts, each part having a series of grooves for nails, means to move said parts independently, and a suitable controlling device to provide for the delivery of the nails with their heads and points in the proper directions.

15. In a nail-assorting mechanism, a plurality of oppositely-inclined plates to receive and guide nails, and means for reciprocating said plates simultaneously in opposite directions to cause nails to travel along said plates in the directions of said inclinations.

16. A nail-assorting mechanism comprising a raceway and a returning-table and being divided into a plurality of parts; and means for reciprocating said parts simultaneously in opposite directions to cause the nails to travel on the raceway and returning-table.

17. In a nail-assorting mechanism, a plate to receive and guide nails, a returning-table, and means for reciprocating said plate and table simultaneously in opposite directions to cause the nails to travel thereon.

18. In a nail-assorting mechanism, a plate for receiving and guiding nails, said plate having provision for rejecting nails not properly lodged thereon; a second plate for receiving and conveying the rejected nails, and means for reciprocating said plates in opposite directions to cause the nails to travel thereon.

In testimony whereof I have signed my name to this specification in the presence of two subscribing witnesses.

BENJAMIN F. MAYO.

Witnesses:
GEO. W. GREGORY,
EMMA J. BENNETT.